United States Patent [19]

Bar-Joseph et al.

[11] Patent Number: 4,761,620

[45] Date of Patent: Aug. 2, 1988

[54] OPTICAL READING OF QUANTUM WELL DEVICE

[73] Assignee: American Telephone and Telegraph Company, AT&T Bell Laboratories, Murray Hill, N.J.

[21] Appl. No.: 937,387

[22] Filed: Dec. 3, 1986

[51] Int. Cl.[4] .......................... H01L 33/02; G02B 5/14; G02F 1/015

[52] U.S. Cl. .......................................... 332/7.51; 350/354

[58] Field of Search ............................ 332/7.51; 372/12; 377/102; 350/354–356, 311; 357/4, 16, 22

[56] References Cited

U.S. PATENT DOCUMENTS

| | | | |
|---|---|---|---|
| 4,525,687 | 6/1985 | Chemla et al. | 332/7.51 |
| 4,546,244 | 10/1985 | Miller | 372/45 |
| 4,549,788 | 10/1985 | Chemla | 350/386 |
| 4,578,127 | 3/1986 | Gossard et al. | 357/16 |
| 4,597,638 | 7/1986 | Chemla et al. | 350/354 |
| 4,626,075 | 12/1986 | Chemla | 350/386 |

OTHER PUBLICATIONS

Miller, D. A. B.; "Physics and Applications . . . in Optics", 30th Intern. Symp. on Electron., Ion & Photon Beams; Boston, MA, 5/27/86, vol. 5, #1, p. 13.

Wood et al; "Enhanced Electroabsorption . . . Optoelectronic Devices"; 11th Intern. Symp., Biarrity, France, 9/28/84, pp. 685–686.

Chemla et al; "Nonlinear Optical Properties . . . and Applications"; Opt. Eng., vol. 24, #4, pp. 556–564, 8/85.

*Primary Examiner*—Nelson Moskowitz

*Attorney, Agent, or Firm*—Daniel D. Dubosky; Gregory C. Ranieri

[57] ABSTRACT

Optical apparatus is disclosed wherein narrow line width light from a source is directed through the substrate of a semiconductor structure and reflected from the gate electrode of a field effect transistor element fabricated on the surface of the semiconductor structure. A quantum well layer serves as the current channel for the field effect transistor, and charge carries from a doped semiconductor layer provide high mobility carriers in the quantum well layer. Changes in the potential between the gate and source electrodes of the field effect transistor causes the normal pinchoff of carriers in the quantum well layer thereby causing changes in the absorption characteristic presented by the quantum well layer. By directing light from the source at the gate electrode through the substrate of the semiconductor structure, a photodetector can be positioned so as to detect a change in light which has passed twice through the quantum well layer, thereby detecting a change in the electrical state of the field effect transistor.

8 Claims, 3 Drawing Sheets

OPTICAL READING OF QUANTUM WELL DEVICE

BACKGROUND OF THE INVENTION

This invention relates to semiconductor quantum well devices and more particularly to devices of this type which can change their optical characteristics.

It is well known in the prior art that semiconductor quantum well devices can be caused to present changes in their optical characteristics. See, for example, U.S. Pat. No. 4,525,687 issued to D. S. Chemla et al. on June 25, 1985. In this Chemla et al. patent a semiconductor device is described having multiple quantum well structures and this device can change its optical characteristics by applying different potentials across the multiple quantum well layers. As shown in FIG. 25 of that patent, an array of such devices can be placed on a substrate and the individual devices can be field controlled by electric potentials in order to change the absorption presented by each of the devices in the array.

With integrated circuits becoming larger and larger, the possibility of optically reading the information developed on such circuits will become more desirable. Devices of the type described in the above-identified Chemla et al. patent can be placed at appropriate points of a very large scale integrated circuit in order to provide a means of optically reading the information that is developed in the circuit. The devices in the above-identified Chemla et al. patent do require a precise stable operating wavelength from the optical source used to read such devices. Less difficulty would be presented in the design of the integrated circuit if the quantum well layers could provide a change in their optical characteristics in accordance with the information presented by the electrical devices without stringent tolerance on the required operating wavelength.

SUMMARY OF THE INVENTION

The present invention is based on our discovery that the optical properties of a quantum well layer can be significantly changed by electrically changing the carrier density in a quantum well layer. In the specific embodiment shown, a field effect transistor (FET) is fabricated wherein the quantum well layer serves as the conduction channel of the FET. By varying the gate voltage the state of the FET is changed from a pinched-off empty channel to a conducting full channel. The corresponding changes in the carrier density in the well causes significant changes in the optical characteristics of the quantum well layer.

In the specific embodiment described the gate electrode is fabricated by depositing a metal on the semiconductor surface, and the optical characteristics of the quantum well layer are determined by projecting the light beam from a source through the substrate structure and reflecting the light beam from the metallic gate electrode. As a result, the light beam is advantageously caused to pass through the quantum well layer twice, thereby increasing the absorption effect on the light beam which is detected after it emerges from the substrate structure.

BRIEF DESCRIPTION OF THE DRAWINGS

The invention will be more readily understood after reading the following detailed description in combination with the drawings wherein.

DETAILED DESCRIPTION

It is now well-known in the art that change carriers can be placed in a quantum well layer by modulation doping. This technique of doping spatially separates the carriers from the impurities which provide them thus resulting in very high mobility materials that have been extensively studied for their electronic transport properties. This technique of modulation doping has been applied in the development of high-speed selectively-doped heterostructure transistors.

Figure 5:
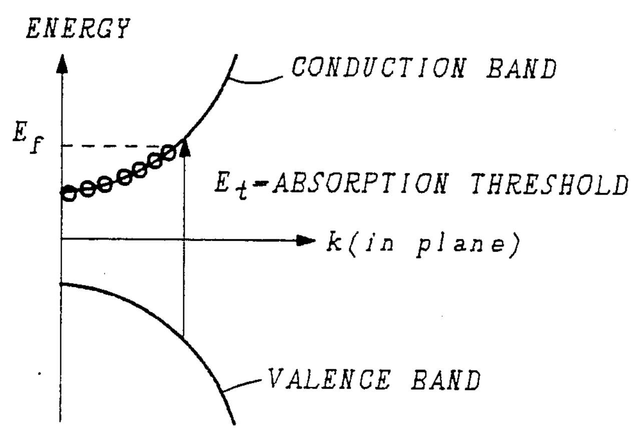

The optical properties of a modulated doped quantum well have not been extensively investigated. As shown in FIG. 5, the placement of carriers into the quantum well causes a filling of the two dimensional subbands up to the fermi energy level $E_f$. As a result the optical absorption which would normally be present in a quantum well which does not have charge carriers cannot be observed and the first absorption which can take place corresponds to the absorption threshold $E_t$ shown in FIG. 5. This shifting of the absorption edge was observed in a modulation doped GaAs quantum well layer reported in the article entitled "Optical Processes of 2D Electron Plasma in GaAs-(AlGa) As Heterostructures", by A. Pinczuk et al., *Solid State Commns.*, Vol. 50, No. 8, pp. 735–739 (1984). This whole behavior of a shifting of the absorption edge can be explained rather completely by the fact that charge carriers have filled the two dimensional subbands up to the fermi level. As a result any of the low-energy transitions which could normally take place in a quantum well layer without carriers cannot take place since the charges are completely filling the subbands up to the fermi level. In accordance with the present invention, these charge carriers are shifted out of the quantum well layer, at least in a portion of that layer, such that absorption can again take place at the wavelengths corresponding to those normally present in a quantum well layer without charge carriers.

Figure 1:
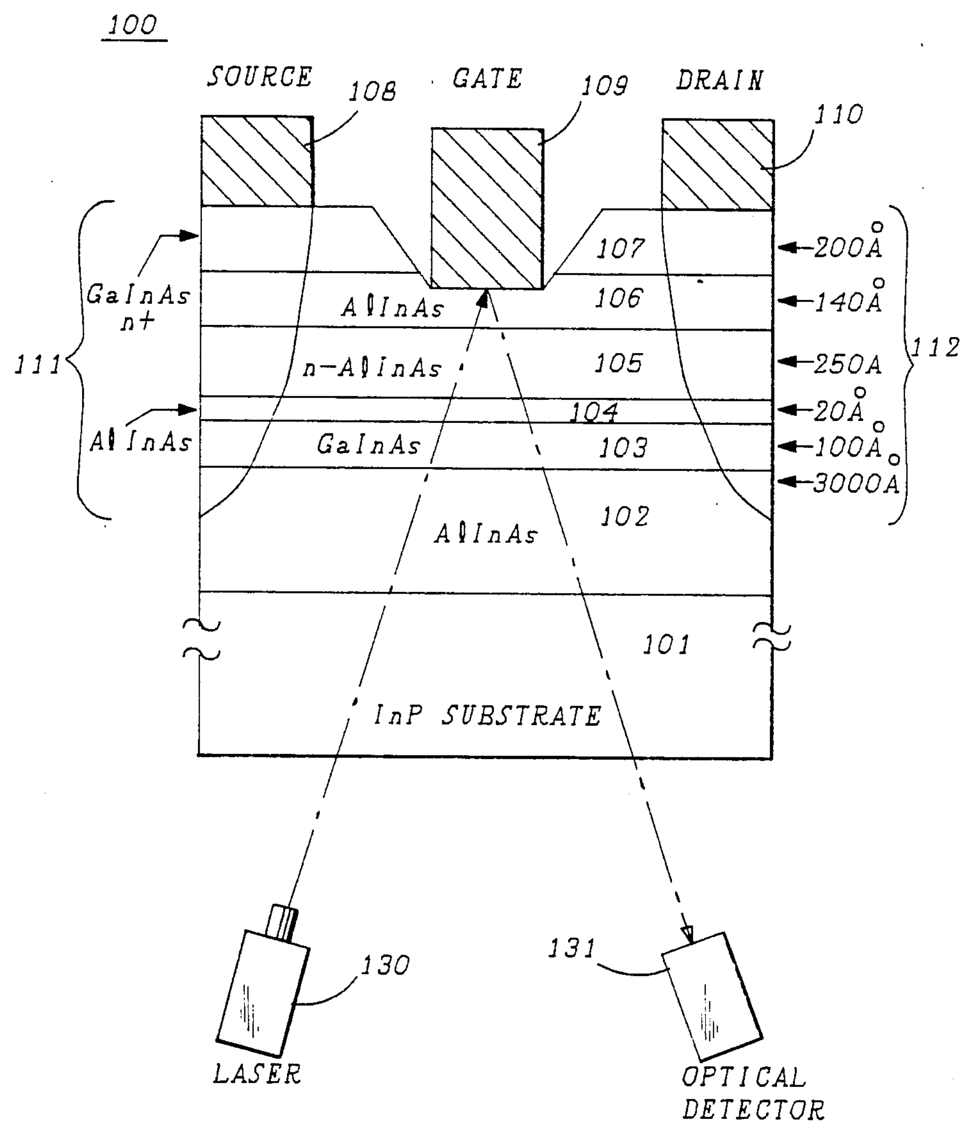
FIG. 1 is a schematic diagram of apparatus constructed in accordance with the present invention.
Figure 2:
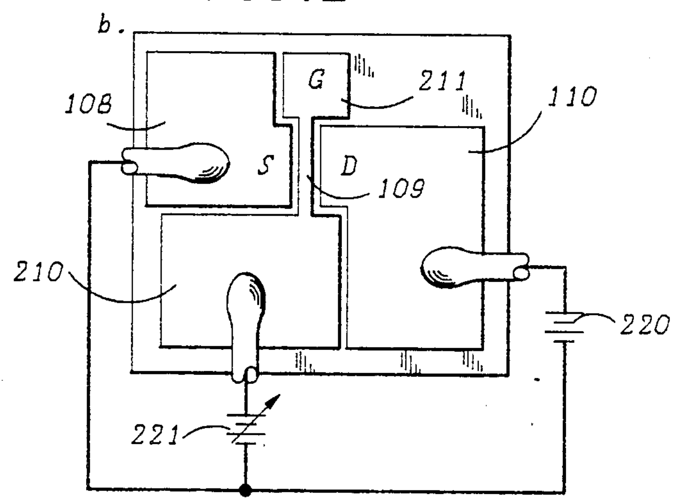
FIG. 2 is a top view of the semiconductor device shown in schematic form in FIG. 1 of the drawings along with the electrical connections made to this device.

A semiconductor structure in which a quantum well layer is provided with charge carriers is shown as structure 100 in FIG. 1. In this semiconductor structure 100 epitaxial layers are grown using a molecular beam epitaxial process on a (100) iron doped indium phosphide (InP) substrate 101. As shown in FIG. 1 the first layer grown on the substrate 101 is an updoped AlInAs buffer layer 102. This layer is grown to a thickness of 3000Å. On top of buffer layer 102 an undoped layer 103 is grown using GaInAs to a thickness of 100Å to provide a quantum well conducting channel for the two dimensional electron gas. This quantum well layer 103 is followed by a 20Å spacer layer 104 consisting of AlInAs followed by a layer 105 consisting of AlInAs which has been doped with silicon to the extent of $1.2\times10^{18}$ atoms per cubic cm. The electron gas in quantum well layer 103 is supplied by electrons which have transferred from the doped layer 105 through the spacer layer 104. Finally an undoped layer 106 consisting of AlInAs is grown to have thickness of 140Å, and a cap layer 107 of GaInAs doped with silicon to the extent of $7\times10^{17}$ atoms per cubic cm. is grown to have a thickness of 200 Å. Source and drain contacts are formed by alloying evaporated AuGe/Au contacts 108 and 110 into regions 111 and 112 in two steps at 400 degrees C. and 430 degrees C. The Schottky gate pattern 109 has two bonding pads 210 and 211 as shown in FIG. 2 in addition to the 1.6 by 100 micrometer gate electrode 109 which is centered in a 5.4 micrometer gap between the source and drain regions.

Figure 4:
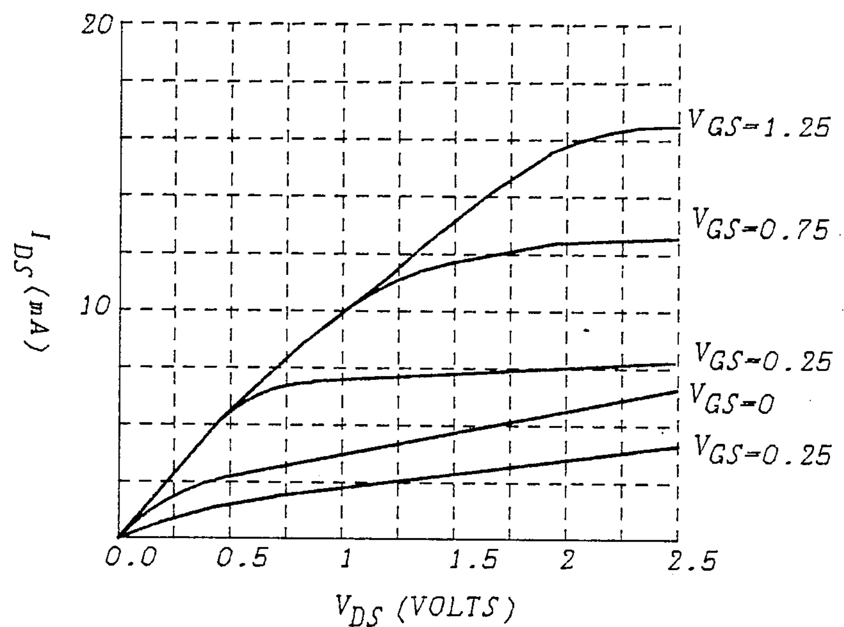

The area of the epitaxial layer which is covered by this pattern consisting of the gate electrode and two bonding pads was recessed by 230Å using a slow chemical etch prior to deposition of the Schottky metal consisting of 300Å of Cr followed by 3000Å of Au. As shown in FIG. 1 this gate electrode is therefore in direct contact with the layer 106. Finally the field effect transistors created on a wafer are isolated by a deep messa etch. An air bridge is also formed during this final step between the gate pad 210 used for bonding and the active gate electrode 109. The second gate pad 211 in FIG. 2 has a dimension of 100 by 100 micrometers. This gate pad was left as a contiguous part of the source-drain mesa in order to serve as an active area for optical probing in a manner to be described hereinbelow. The underside of substrate 101 was polished and the individual devices were scribed from the process wafer and mounted onto sapphire plates since the devices were used individually in the experiments conducted. After being mounted, the field effect transistor devices provided the current voltage characteristics shown in FIG. 4.

Figure 3:
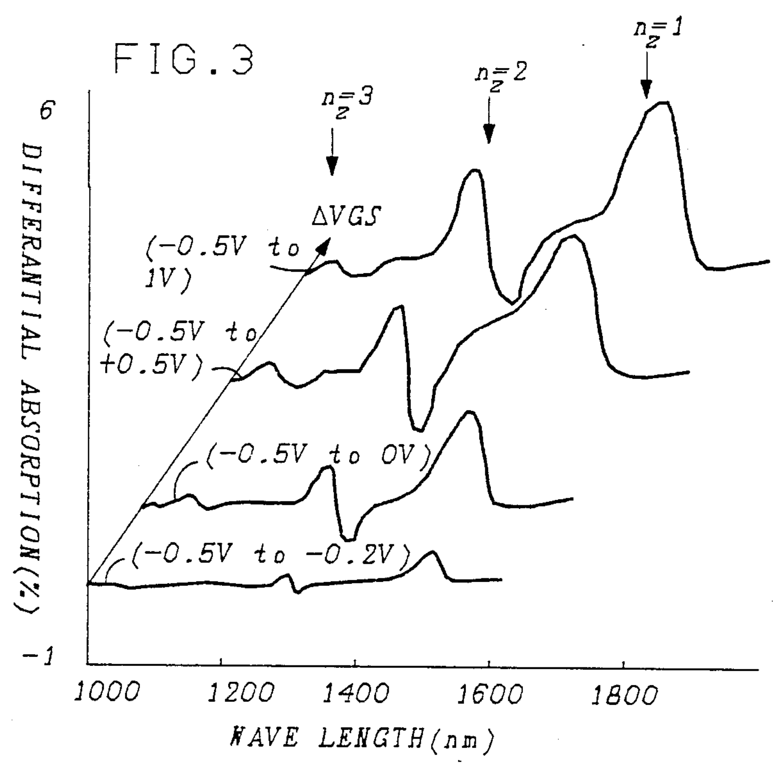
FIGS. 3, 4 and 5 are curves and diagrams useful in the description of the present invention.

In accordance the principles of the invention, the light output from a monochromatic optical source such as laser 130 is focused onto the active pad 211 of the gate electrode through the InP substrate and the epitaxial layers below the gate electrode. This light is reflected from the Cr/Au electrode and detected by a lead sulfide photodetector 131. Source-drain potential was provided by a potential source 220 as shown in FIG. 2, and the potential provided by source 221 between the gate electrode and source electrode was changed during the experiment, thereby changing the number of charge carriers in the quantum well layer 103 in a region below the gate electrode 109. The curves shown in FIG. 3 are the result of measuring the change in the intensity of the reflected beam as measured by detector 131 as a function of both the wavelength of the light provided by source 130 and as a function of the gate-source voltage ($\Delta V_{gs}$) provided by potential source 221. This change in light intensity is shown along a vertical axis in FIG. 3 as the change in absorption (differential absorption) as the gate-source voltage is changed. As shown in FIG. 3 the gate source voltage was changed from −0.5 volts to −0.2, 0, 0.5 or 1 volts and the wavelength of the light from source 130 was changed from 1000 nanometers to 1700 nanometers. As further shown in FIG. 2 different optical absorptions are obtained for each of the values of the gate source voltage. A large differential absorption of about 3 percent was clearly seen at the position of the $n_z=1$ exciton peaks and a somewhat smaller change at the $n_z=2$ resonance. By operating the optical source 130 at a wavelength corresponding to the $n_z=1$ exciton peak the light detected by optical detector 131 can be used to determine the logic state of the field effect transistor. Accordingly this apparatus provides an optically-read field effect transistor. Devices of the type shown as 100 can be placed at appropriate points on a very large scale integrated circuit in order to provide a means whereby information present in the circuit can be optically read.

A qualitative understanding of the absorption spectra shown in FIG. 3 can be obtained by considering the effect of phase-space filling and bandgap renormalization. As carriers are injected into the channel provided by layer 103 the $n_z=1$ conduction sublevel is gradually populated and the carriers are distributed with a fermi distribution. These occupying states cannot contribute to absorption hence the absorption is quenched at that wavelength. As the gate source voltage decreases from 1.0 volts the number of carriers present in the carrier channel provided by layer 103 increases and quenching of the absorption at the wavelength corresponding to the $n_z=1$ conduction sublevel takes place as shown in FIG. 3. Accordingly by varying the gate-voltage the carrier density in the quantum well can continuously be varied, and the absorption characteristics of the quantum well can be changed, thereby providing a mechanism whereby the electrical characteristics of the field effect transistor can be optically read. Because of the phenomena which causes this change, we have termed the effect phase-space absorption quenching (PAQ).

Although the invention has been described in an embodiment wherein the quantum well layer has received its charge by virtue of modulation doping, it should be understood that other techniques that provide a quantum confinement of charge may also be used including direct doping of the quantum well. Some examples of field effect transistors that are constructed using other techniques of quantum confinement are disclosed in the article by T. J. Drummond et al. entitled "Modulation-Doped GaAs/(Al,Ga)As Heterojunction Field-Effect Transistors: MODFETs", *Proceedings of the IEEE*, Vol. 74, No. 6, June 1986, pp. 773–822.

What has been described hereinabove is an illustrative embodiment of the present invention. Numerous departures may be made by those skilled in the art without departing from the spirit and scope of the present invention. While the invention has been described in connection with an embodiment which uses the InGaAlAs materials system it should be apparent to those skilled in the art that the invention is equally applicable to other semiconductor material systems. The entire invention is based on our discovery that changing the carrier density in a quantum well can produce significant changes in its optical characterists. More than one quantum well can be used in the semiconductor structure to increase the absorption effect. In addition, devices other than field effect transistors can be utilized in order to provide the changes in the carrier density. In fact, it should be obvious to those skilled in the art that an entire field effect transistor is not necessary in order to practice the present invention and that any two electrodes may be used to change charge density in the quantum well layer. It should also be obvious to those skilled in the art that changes in the absorption characteristic can only occur when there are changes in other characteristics such as the refractive index. Accordingly the invention can be utilized to provide changes in the refractive index which in turn can be detected by means other than those which detect amplitude changes in the light density. The change in absorption can be enhanced by projecting the light beam along a quantum well which serves as a waveguide rather than through the quantum well walls as in the embodiment described.

What is claimed is:

1. Optical apparatus for detecting a change in an electrical signal comprising a modulation-doped semiconductor structure having a region that includes at least one quantum well layer having charge carriers, a doped semiconductor layer in substantially close proximity to said at least one quantum well layer for providing said charge carriers, means responsive to the change in said electrical signal for changing the number of charge carriers in a region of said at least one quantum well layer, a source of light having a predetermined wavelength, said source being oriented such that the light passes through the region of said at least one quantum well layer, and means for detecting changes in the light that emerges after passing through said region of said at least one quantum well layer.

2. Optical apparatus as defined in claim 1 wherein said semiconductor structure further includes a buffer layer epitaxially grown between said doped semiconductor layer and said at least one quantum well layer.

3. Optical apparatus as defined in claim 1 wherein said means for changing the number of charge carriers comprises source, gate, and drain electrodes positioned on said semiconductor structure such that said at least one quantum well layer serves as a current channel between said source and drain electrodes, whereby changing a potential between said source and gate electrodes changes the number of charge carriers in a region of said at least one quantum well layer.

4. Optical apparatus for detecting a change in an electrical signal comprsing a modulation-doped semiconductor structure having at least one quantum well layer having charge carriers, a doped semiconductor layer in substantially close proximity to said at least one quantum well layer for providing said charge carriers thereto, means for changing the density of charge carriers in said quantum well layer in response to said electrical signal, a source of light having a predetermined wavelength and positioned so as to direct the light at said quantum well layer in said semiconductor structure, and means for detecting changes in light at said predetermined wavelength positioned such that the light is detected after it has passed through said quantum well layer.

5. Optical apparatus as defined in claim 4 wherein said semiconductor structure further includes a barrier layer epitaxially grown between said doped semiconductor layer and said quantum well layer.

6. Optical apparatus as defined in claim 4 wherein said means for changing the density of charge carriers comprises at least two electrodes positioned on said semiconductor structure such that the changes in a potential between said two electrodes causes changes in the number of charge carriers in at least a region of said quantum well layer.

7. Optical apparatus as defined in claim 6 wherein said at least two electrodes serve as the gate and source electrodes of a field effect transistor configuration, and said gate electrode is fabricated from a material capable of reflecting light at said predetermined wavelength.

8. Optical apparatus as defined in claim 7 wherein said source of light is positioned so as to direct the light through said quantum well layer to be reflected from said gate electrode, and said means for detecting changes in light at said predetermined wavelength is positioned to receive the light reflected from said gate electrode.

* * * * *

UNITED STATES PATENT AND TRADEMARK OFFICE

CERTIFICATE OF CORRECTION

PATENT NO. : 4,761,620

DATED : Aug. 2, 1988

INVENTOR(S) : Israel Bar-Joseph, Tao-Yuan Chang, Daniel S. Chemla, David A. B. Miller It is certified that error appears in the above-identified patent and that said Letters Patent is hereby corrected as shown below:

Title page:

INSERT:

(75) Israel Bar-Joseph, Highlands, NJ
Tao-Yuan Chang, Lincroft, NJ
Daniel S. Chemla, Rumson, NJ
David A. B. Miller, Fair Haven, NJ Signed and Sealed this Thirteenth Day of December, 1988

*Attest:*

DONALD J. QUIGG

*Attesting Officer* *Commissioner of Patents and Trademarks*